Patented Oct. 12, 1937

2,095,801

UNITED STATES PATENT OFFICE 2,095,801

PROCESS FOR ISOLATION OF PARACRESOL FROM TAR ACID MIXTURES

Karl Henry Engel, West Englewood, N. J., assignor to The Barrett Company, New York, N. Y., a corporation of New Jersey No Drawing. Application September 12, 1935, Serial No. 40,277

17 Claims. (Cl. 260—154)

This invention relates to the isolation of paracresol from tar acid mixtures.

It is well known that the crude tar acid mixtures obtained from coal tar contain ortho-cresol, boiling point about 191° C., meta-cresol, boiling about 202.4° C., and para-cresol, boiling point about 202.2° C., together with varying amounts of other phenolic compounds, such as xylenols, etc. From this mixture relatively pure ortho-cresol may be obtained by fractional distillation, since its boiling point (191° C.) is sufficiently removed from that of the meta- and para-cresols. Separation of the meta- and para-cresols as individuals, however, cannot be satisfactorily accomplished by fractional distillation, and, therefore, resort must be had to other methods.

German Patent No. 137,584 of 1901 discloses a process for the isolation of para-cresol from cresol mixtures, involving the treatment of the cresol mixture with anhydrous oxalic acid crystals. According to the specification of this German patent, the oxalic acid reacts with the para-cresol to form a para-cresol-oxalic-acid ester, but it was later found by Darzens (Compt. Rend. 192 1657–9) that one or more true addition compounds are formed with no loss of water.

The object of this invention is to provide a commercially workable method of isolating para-cresol from tar-acid mixtures containing para- meta-cresol in which effective utilization of oxalic acid may be attained and an increased yield of para-cresol results. Loss of oxalic acid, which is a relatively expensive reagent, is reduced and the formation of a by-product containing a large percentage of para-cresol is avoided. The process readily permits the use, without waste, of an excess of oxalic acid to assure the maximum recovery of para-cresol, the oxalic acid being recovered for re-use, as described below.

In accordance with this invention the tar-acid mixtures containing meta- and para-cresol are treated with hydrated oxalic acid or a concentrated aqueous solution of oxalic acid, after which the mixture is dehydrated by evaporation of the water under reduced pressure, and then cooled to cause the formation of crystals of the para-cresol-oxalic-acid addition compound.

The addition of hydrated oxalic acid as a concentrated aqueous solution of oxalic acid to a mixture of cresols results in the formation of a liquid mixture, hence efficient and intimate distribution of oxalic acid through the cresol mixture becomes possible with adequate agitation. When the resultant mixture is heated under reduced pressure and the water thus removed, fine crystals of oxalic acid are suspended throughout the mixture. It will be appreciated that at least a portion of the anhydrous oxalic acid formed is dissolved in the mixture of cresols, the crystalline oxalic acid representing the excess of acid over that required to saturate the mixture. If the para-cresol content of the mixture is relatively low and consequently relatively small amounts of oxalic acid are employed substantially all of the oxalic acid may be present in dissolved form. The para-cresol-oxalic-acid addition compound is formed on cooling the solution, and may be removed from the mother liquor by filtration, or by centrifuging.

The para-cresol-oxalic-acid addition compound obtained in the manner above described may be washed with a suitable organic solvent, such as benzene, xylene, light petroleum distillate, carbon tetrachloride, etc., in order to remove adhering mother liquor containing chiefly unreacted cresol; the washed crystals are mixed with water, and the mixture maintained preferably at a temperature of 80° C. to 90° C., whereby para-cresol is liberated and separates as the upper layer and the oxalic acid enters the water layer. The oxalic acid solution thus obtained may be used to treat a fresh supply of cresol mixture and the separation repeated as described above. Fresh hydrated oxalic acid or aqueous oxalic acid solution or both may be added to the solution from a previous batch if the amount of recovered oxalic acid is not sufficient to treat the desired amount of tar-acid mixture. This cyclic re-use of the oxalic acid without the necessity of a separate dehydrating step is an important advantage of this invention.

The evaporation of an oxalic acid solution recovered from a previous operation to secure anhydrous oxalic acid for subsequent use in isolating para-cresol, as called for by the German patent, is a troublesome process. It not only involves an additional process step and additional equipment, but necessitates the recovery from an aqueous solution, by evaporation of water, of dry crystals of a substance, oxalic acid, which is sensitive to heat and undergoes thermal decomposition. To minimize loss from decomposition careful temperature control is necessary, and since I have found that the fineness of the oxalic acid crystals used is important in the success of the para-cresol recovery, regulation of the evaporation conditions to control the fineness of the crystals would likewise be necessary, or fine mechanical comminution would be required.

These disadvantages are avoided by the relatively simple procedure of my invention, which in this respect, follows a course directly contrary to the teaching of the German patent. By my procedure, viz., dehydration of the oxalic acid in the presence of the tar-acid mixture undergoing treatment, the anhydrous oxalic acid is formed in a fine crystalline or dissolved form in intimate admixture with the tar acids and consequently is in reactive state. I obtain substantially improved yields, reduce the over-all consumption of oxalic acid and shorten the reaction time (i. e. increase the output for given apparatus).

The organic solvent, for instance, xylene, after being used for washing the para-cresol addition compound, contains tar acids and a small amount of dissolved oxalic acid. To remove the oxalic acid, a solution of sodium carbonate may be added and the aqueous sodium oxalate solution removed from the xylene solution of tar acids. This xylene solution is then fractionally distilled to recover the xylene which may be employed in subsequent washing operations.

I have found that cresol mixtures treated with oxalic acid should contain at least 8–12 per cent, and preferably in excess of about 20 per cent, of para-cresol to obtain satisfactory separation of para-cresol. When a mixture containing about 8–9 per cent of para-cresol and about 92 per cent of other tar acids, largely meta-cresol, is treated as hereinabove described and cooled to about 22° C., a eutectic containing meta-cresol, para-cresol, and oxalic acid separates. However, mixtures containing an amount of para-cresol in excess of 8–12 per cent, and preferably in excess of about 20 per cent, may be treated in accordance with this invention, and the separation of para-cresol present in excess of the lower limit indicated above (8 per cent) accomplished.

The temperatures maintained in the cresol-oxalic-acid mixture during the distilling operation should be below 125° C., the exact temperature depending on the vacuum available, and should preferably be below 100° C. when a vacuum of about 28 inches of mercury is employed; at temperatures above about 125° C. considerable of the oxalic acid in the mixture treated undergoes decomposition, whereas at temperatures of 100° C. or below the amount of oxalic acid decomposed is not serious.

The dehydrated mixture should for optimum results not be cooled to a temperature appreciably below the eutectic temperature, which is about 22° C.: preferably the mixture should be cooled to a temperature of about 30° C.; 20° C. is approximately the lowest permissible temperature at which contamination of the para-cresol-oxalic-acid addition compound with meta-cresol-oxalic-acid compound is avoided.

Typical examples of the invention are given below:

Example 1.—10 parts of a tar-acid mixture containing approximately 31 per cent para-cresol, 55.5 per cent meta-cresol, and 13.5 per cent of phenol, ortho-cresol and xylenols and having a specific gravity at 25° C. of 1.032, and a boiling range of 199.5 to 202.9° C. were treated with 2 parts of hydrated oxalic acid crystals,

(COOH)₂.2H₂O.

The mixture was placed in an agitated evaporating still, connected to a water-cooled condenser, and the water removed from the mixture by distillation under an absolute pressure of 10 to 20 mm. of mercury. The temperature of the mixture in the still rose gradually to about 100° C., when no more water passed into the condenser. The resulting dehydrated mixture of tar acids and oxalic acid was agitated and cooled to about 25° C., whereupon the formation of a crystalline precipitate of the para-cresol-oxalic-acid compound was found completed. This material was separated by centrifuging and then washed with xylene to remove adhering mother liquor. The washed crystals were decomposed by mixing them with 150 parts of water and heating the mixture to about 90° C. with the result that the para-cresol separated in an upper layer and the oxalic acid dissolved in the lower water layer. The para-cresol layer was separated, washed with additional water to remove remaining dissolved oxalic acid, heated to drive off residual water, and fractionally distilled, the xylene being thereby removed. The yield was 1.5 parts of para-cresol of 90% purity.

Example 2.—10,415 pounds of a commercial meta-para-cresol containing 33.5% of para-cresol and 60.4% of meta-cresol were mixed with 2,323 pounds of hydrated oxalic acid of which 358 pounds were purchased commercial hydrated oxalic acid and 1,965 pounds were in solution (about 50% concentration) recovered from previous operation in the manner described below. The mixture, in several batches, was agitated and heated under vacuum ranging from 26⅞" to 28" and a final temperature of 94°–98° C. The mass was allowed to cool, crystallization of the addition compound commencing at about 65° to 70° C., and cooling was continued until a temperature of 27° C. was reached. The mixture was tested for water content, which was found to be 0.7–0.8%. Crude crystals of the addition compound, weighing 5,036 pounds were recovered by centrifuging the mixture. Twenty-five hundred pounds of these crystals were mixed with an equal weight of xylene, and stirred for one hour and centrifuged again, giving 2,250 pounds of washed crystals with cresol content testing 85% para-cresol. Decomposition of these crystals and recovery of para-cresol and oxalic acid was accomplished in the following manner:

To each 1,000 pounds of crystals were added 500 pounds of water, the mixture heated to about 80° C. and the oxalic acid layer separated. An additional 200 pounds of water was used to extract most of the remaining oxalic acid in the cresol layer and the latter was finally neutralized with a weak solution of soda ash to remove the last traces of oxalic acid. The crude washed para-cresol was then distilled to remove water and xylene and the 85% pure para-cresol recovered. The oxalic acid was reused in treating subsequent batches of meta-para-cresol in like manner.

Example 3.—2,252 pounds of a commercial meta-para-cresol containing 35% para-cresol were mixed with an aqueous solution of oxalic acid containing 442 pounds of oxalic acid hydrate and the mixture heated to 98° C. under a vacuum of 28½", whereupon most of the water was removed. This batch was then cooled to 37° C. A second batch of 1,844 pounds of meta-para-cresol of the same quality was treated with 417 pounds of oxalic acid hydrate in solution and when the water had been removed at 100° and 28¼" vacuum, this batch was added to the previously cooled batch. The combined mixture containing 0.7% water was cooled to an average temperature of 28° C. The mixture was centrifuged and the crystals were washed on the centrifuge with 2,042 pounds of xylene to remove adhering cresol. The recovered crystals weighed 1,991 pounds. They were treated with hot water whereupon they were decomposed into para-cresol and oxalic acid. After separation of the oxalic acid solution and additional washing to remove oxalic acid from the cresol, the crude para-cresol was recovered by fractional distillation and yielded 862 pounds of para-cresol of 24.4° C. melting point, corresponding to a purity of 86.5% para-cresol.

*Example 4.*—As an alternative method of operation, 1,700 lb. of meta-para-cresol containing 33.8% of para-cresol and 60.5% of meta-cresol were mixed with 168 lb. of oxalic acid crystals and 192 gals. of a solution containing 630 lb. of oxalic acid hydrate crystals and the water removed from this mixture by heating it under vacuum. The final temperature of heating was 96° C., the final vacuum, 28 in., and the final water content, 0.8%. To this hot, dehydrated mixture 1,700 lb. of cold meta-para-cresol of the above composition were added and the temperature fell immediately to 70° C. Cooling water was used in the jacket of the reaction vessel to bring the temperature to 23.5° C. The cooled mixture was centrifuged yielding 1,999 lb. of crystals whose cresol content tested 63.6% para-cresol. These crystals were then purified by stirring in cold xylene, centrifuging and subsequently decomposing them with water as above described. The para-cresol recovered by distillation had a purity of 85.7%.

The term "hydrous oxalic acid" as used herein is intended to include hydrated crystals as well as an aqueous solution of oxalic acid.

It is to be understood that this invention is not restricted to the present disclosures, otherwise than as defined by the appended claims.

I claim:

1. A method for the preparation of the crystalline addition compound of para-cresol and oxalic acid which comprises mixing a tar acid material containing para-cresol with hydrous oxalic acid, removing water from the mixture in the presence of the tar acid material to form anhydrous oxalic acid in intimate admixture with the tar acids and cooling the dehydrated mixture to form the crystalline addition compound.

2. A method for forming the crystalline addition compound of para-cresol and oxalic acid which comprises mixing a tar-acid material containing para-cresol with oxalic acid and water, the amount of water present being sufficient to cause at about the temperature of dehydration substantially complete solution of the oxalic acid, heating the mixture to eliminate water, and cooling the mixture to form the crystalline addition compound.

3. A process of separating para-cresol from a mixture of para- and meta-cresols, which comprises forming a mixture of said cresols and hydrous oxalic acid, removing water from the mixture to form anhydrous oxalic acid in intimate admixture with said cresols, causing the oxalic acid to react with the para-cresol to form an addition compound, and separating para-cresol from said addition compound.

4. A process of separating para-cresol from a mixture of para- and meta-cresols, which comprises forming a mixture of said cresols, oxalic acid and water such that the oxalic acid is substantially completely dissolved, distilling the mixture to remove water therefrom, causing the oxalic acid to react with the para-cresol to form an addition compound, and separating the para-cresol from said addition compound.

5. A process of separating para-cresol from a mixture of para- and meta-cresols containing para-cresol in excess of 8 per cent by weight, which comprises forming a mixture of said cresol, oxalic acid and water, causing the oxalic acid to react with the para-cresol to form an addition compound, by removing the water therefrom by evaporation, and separating the para-cresol from said addition compound.

6. A process for the separation of para-cresol from tar-acid mixtures containing para-cresol in excess of 8 per cent by weight, which comprises treating said tar acid mixtures with oxalic acid in the presence of water, removing said water by evaporating the same, separating the para-cresol addition compound, and isolating the para-cresol therefrom.

7. A method for the separation of para-cresol from tar-acid mixtures, which comprises treating said tar-acid mixtures with an aqueous solution of oxalic acid, distilling the mixtures to remove water therefrom, causing the oxalic acid and para-cresol to react to form a para-cresol-oxalic-acid addition compound, separating the para-cresol-oxalic-acid addition compound, and recovering the para-cresol compound.

8. A method for the separation of para-cresol from tar-acid mixtures, which comprises treating said tar-acid mixtures with hydrated oxalic acid, distilling the mixtures to remove water therefrom, causing the oxalic acid and para-cresol to react to form a para-cresol-oxalic-acid addition compound, separating the para-cresol-oxalic-acid addition compound, and recovering the para-cresol compound.

9. A method for the separation of para-cresol from tar acids containing para-cresol in excess of 8 per cent by weight, which comprises treating said tar acids with an aqueous solution of oxalic acid, dehydrating the resulting mixture by evaporating the water therefrom, cooling the dehydrated mixture whereby crystals of para-cresol-oxalic-acid addition compound are formed, and removing the crystals of para-cresol-oxalic-acid addition compound formed.

10. A method for the separation of para-cresol from tar acids which contain in excess of 8 per cent para-cresol by weight, which comprises treating said tar acids with hydrated oxalic acid, evaporating water from the resulting mixture to dehydrate the same, cooling the dehydrated mixture, whereby crystals of para-cresol-oxalic-acid addition compound are formed, and removing the para-cresol-oxalic-acid addition compound.

11. A method for the separation of para-cresol from tar acids, which comprises treating said tar acids with an aqueous solution of oxalic acid, dehydrating the resulting mixture by evaporating water therefrom under vacuum, cooling said dehydrated mixture, whereby crystals of para-cresol-oxalic-acid addition compound are formed, removing said crystals of para-cresol-oxalic-acid addition compound, decomposing said crystals with water, and separating the para-cresol which is liberated.

12. A method for the separation of para-cresol from tar acids, which comprises treating said tar acids with an aqueous solution of oxalic acid, dehydrating the resulting mixture by evaporating the water therefrom, cooling until precipitation of para-cresol-oxalic-acid addition compound occurs, and adding thereto a quantity of hot, freshly dehydrated mixture of tar acids and oxalic acid, cooling the resultant mixture, removing the crystals of para-cresol-oxalic-acid addition compound formed thereby, decomposing said crystals in warm water, and separating the para-cresol which is liberated.

13. A method for the separation of para-cresol from tar acids, which comprises treating said tar acids with an aqueous solution of oxalic acid, evaporating water from the resulting mixture to dehydrate the mixture, cooling the dehydrated product to a temperature not below about 22° C., removing the crystals of para-cresol-oxalic-acid addition compound formed thereby, decomposing said crystals with water, and separating the para-cresol which is liberated.

14. A method for the separation of para-cresol from tar acids containing para-cresol in excess of 8 per cent by weight, which comprises treating said tar acids with an aqueous solution of oxalic acid, dehydrating the resulting mixture by evaporating the water therefrom under vacuum, cooling the dehydrated product to a temperature not below about 22° C., mixing the cooled product with a hot, dehydrated mixture of tar acids and oxalic acid, cooling the resultant mixture to a temperature not below about 22° C., separating the crystals of para-cresol-oxalic-acid addition compound formed thereby, washing said crystals with an organic solvent for tar acids, decomposing said crystals with water at a temperature of about 80° to 90° C., and separating the para-cresol which is liberated.

15. The process of separating para-cresol from a mixture of para- and meta-cresols, which comprises mixing hydrous oxalic acid with said mixture, subjecting the resultant mixture to distillation to remove water therefrom, causing the oxalic acid to react with the para-cresol of said mixture and separating the para-cresol from the product resulting from the reaction of the oxalic acid with the para-cresol in said mixture.

16. The process of separating para-cresol from a mixture of para- and meta-cresols, which comprises mixing hydrous oxalic acid with the cresol mixture, removing water from the resultant mixture by evaporation to form fine crystals of oxalic acid in intimate admixture with the said mixture of para- and meta-cresols, cooling the dehydrated mixture to a solid para-cresol-oxalic-acid addition compound, and recovering the para-cresol from the addition compound.

17. The process of separating para-cresol from a mixture of para- and meta-cresols, which comprises mixing hydrous oxalic acid with the cresol mixture, subjecting the resultant mixture to distillation under vacuum to drive off the water therefrom and form a solid para-cresol-oxalic-acid addition compound, and decomposing the addition compound to recover para-cresol therefrom.

KARL HENRY ENGEL.